July 8, 1930. F. H. VAN HOUTEN 1,770,222
DOUGH HANDLING APPARATUS
Filed June 18, 1929
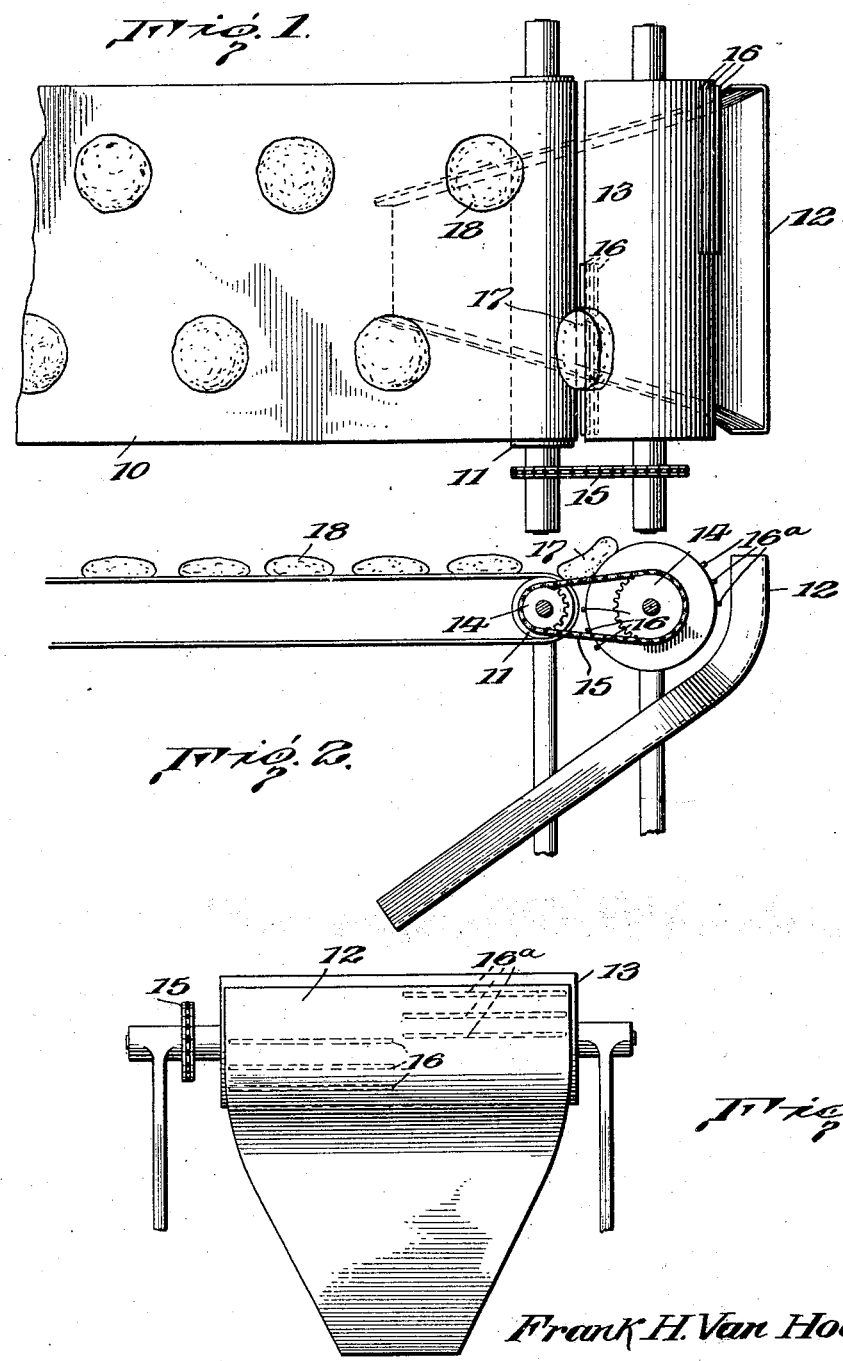
Inventor
Frank H. Van Houten,
By
his Attorneys Patented July 8, 1930

1,770,222

UNITED STATES PATENT OFFICE

FRANK H. VAN HOUTEN, OF BEACON, NEW YORK, ASSIGNOR TO DUTCHESS TOOL COMPANY, OF BEACON, NEW YORK, A CORPORATION OF NEW YORK

DOUGH-HANDLING APPARATUS

Application filed June 18, 1929. Serial No. 371,829.

This invention relates to dough handling apparatus.

Primarily, the invention contemplates a transfer mechanism for delivering individual lumps of dough or loaves from a plurality of rows of such lumps or loaves on one conveyor to a second conveyor along which the lumps or loaves transferred thereto travel in a single row with the successive lumps or loaves equi-distantly spaced from each other.

More specifically, the invention consists in providing a transfer mechanism or roll at the delivery end of a traveling belt adapted to support a plurality of rows of lumps of dough or loaves, said roll being so constructed as to take the lumps of dough from the several rows on the belt in a predetermined order and deliver or deposit them at regular intervals to a chute along which they travel in a single row with the successive lumps equi-distantly spaced from one another. Preferably, there are two rows of lumps of dough or loaves on said belt and the transfer roll has one or more cleats or projections at each end of its periphery, the cleat or cleats at one end being located diametrically opposite those at the other end with the remainder of the periphery of the roll perfectly smooth, whereby the roll will assist in supporting a lump of dough at the delivery end of the belt until said lump is engaged by one of the cleats or groups of cleats, whereupon it will be carried around by the roll and deposited in the chute.

With these and other objects in view the invention consists in certain details of construction and combinations and arrangements of parts, all as will hereinafter be more fully described and the novel features thereof particularly pointed out.

In the accompanying drawings,

Figure 1 is a top plan view illustrating the present transfer mechanism associated with the delivery end portion of a traveling belt such as is generally used in connection with what are known in the art as dough proofers;

Fig. 2 is a side view of the apparatus illustrated in Fig. 1;

Fig. 3 is an end elevational view.

The present invention is, of course, applicable to various kinds of dough handling apparatus wherein lumps of dough, or loaves, arranged in a plurality of rows on one conveying surface are to be transferred and deposited on a second conveying surface on which they travel in a single row. For this reason the transfer mechanism is simply illustrated in the present instance in connection with the delivery end portion of the delivery belt of a dough proofer, it not being necessary to show any of the proofing apparatus or any other form of apparatus with which the transfer mechanism may be used.

As illustrated in Fig. 1, the moving surface or endless traveling belt 10 whose delivery end is supported on a pulley 11 is adapted to support a plurality of laterally spaced rows of lumps of dough or loaves. Assuming these loaves to be those which have been discharged from the proofing apparatus they are next to be delivered to a molding machine, this being the ordinary sequence in the steps of handling dough in preparing it for baking. However, to provide a proofing apparatus in handling the lumps in two or more rows it is necessary that they be fed to the molding machine in a single row and hence it is necessary that the lumps in the several rows on belt 10 be transferred to a single row preparatory to being fed to the molding machine. For this purpose, i. e., transferring a plurality of rows of loaves on belt 10 to a single row for feeding to the molding apparatus, there is provided a transfer mechanism at the delivery end of belt 10 which will take the loaves from the several rows on belt 10 in a predetermined order and transfer them to a chute 12 from which they can be fed to the molding apparatus, the loaves transferred by said transfer mechanism being deposited in the chute in a single row with successive lumps or loaves equidistantly spaced apart one from the other.

Preferably such transfer mechanism comprises a roll 13 interposed between chute 12 and the delivery end of belt 10. It is, of course, understood that the belt 10 is a continuously moving one, suitable means being provided for driving pulley 11 and that pulley is connected to the shaft of roll 13 by sprockets 14 and sprocket chain 15, the sizes of the sprockets 14 being so proportioned one to the other that the surface speed of roll 13 is slightly in excess of the speed of belt 10. At certain points on the periphery of roll 13 there is means for engaging a loaf as it passes off of the end of belt 10 whereby the loaf will be carried around by roll 13 and deposited in chute 12. Such means may consist of one or more cleats 16, 16ª, the number of such means corresponding to the number of rows of loaves that are adapted to be supported on belt 10. That is, where there are only two rows of loaves on belt 10 there are only two sets of cleats as shown at 16, 16ª. With a two row mechanism, the cleats of group 16 are located diametrically opposite to the set of cleats 16ª and the inner remaining portion of the periphery of roll 13 is perfectly smooth. In addition to two sets of cleats being diametrically opposite one another the two sets of cleats are also spaced longitudinally of the roll 13 so that each set is in registry with the line of movement of a different row of loaves on belt 10.

With this arrangement, a loaf upon reaching the end of belt 10 as indicated at 17 is partially supported on roll 15 and as the speed of the roll is slightly in excess of the belt speed the loaf is held up, so to speak, or, as might be described, it is prevented from falling or dropping into the space between the surface of the roll and the surface of the belt passing around roll 11. The loaf is held in this position until one of the sets of cleats (set 16) in the present illustration comes into engagement therewith, whereupon, the loaf is carried around the upper surface of the roll and deposited in chute 12. During this movement or transfer of leaf 17 it will be understood that loaf 18 of the other row of loaves on belt 10 will be conveyed to the delivery end of said belt and will be partially sustained there by the surface of roll 13 until set of cleats 16ª comes into contact therewith, whereupon the loaf will be carried around by roll 13 and deposited in chute 12.

As illustrated chute 12 is tapered toward its lower end so that the loaves are delivered thereby in a single row to suitable conveying devices for the purpose of being fed to the molding apparatus. It will be seen that only one loaf from one row can be deposited in chute 12 at one time, so, regardless of whether the loaves of the two rows on belt 10 reach roll 13 at the same time or whether they are staggered with respect to one another along belt 10, nevertheless, there will only be one loaf to deposit in chute 12 each half revolution of roll 13 so that the loaves successively deposited in chute 12 are deposited therein at regular intervals.

It will also be appreciated that the means on the periphery of roll 13 for picking up the loaves and transferring them to chute 12 need not necessarily take the form of cleats. Whatever the form of means for this purpose it is only essential that the several sets of means, so to speak, be properly spaced longitudinally of roll 13 and circumferentially of said roll so as to pick up the loaves from the several rows of loaves regardless of the number of rows in a predetermined order.

What I claim is:

1. In a dough handling apparatus, the combination of an imperforate traveling surface adapted to support a plurality of rows of lumps of dough, a chute adjacent the delivery end of said surface, and means interposed between said surface and chute for transferring the lumps of dough separately and individually in a predetermined order from the several rows on said surface to said chute.

2. In a dough handling apparatus, the combination of a traveling surface adapted to support a plurality of rows of lumps of dough, a chute adjacent the delivery end of said surface, and means interposed between said surface and chute adapted to engage said lumps of dough only after they have reached the delivery end of said surface for transferring the lumps of dough in a predetermined order from the several rows on said surface to said chute, the successive lumps transferred to said chute being deposited therein at regular intervals of time independently of the spacing of the lumps in the individual rows on said surface.

3. In a dough handling apparatus, the combination of a traveling surface adapted to support a plurality of rows of lumps of dough, a chute, a transfer roll at the delivery end of said surface, and means on said roll spaced from said surface for transferring lumps of dough individually from the several rows to said chute in a predetermined order.

4. In a dough handling apparatus, the combination of a traveling surface adapted to support a plurality of rows of lumps of dough, a chute, a transfer roll at the delivery end of said surface, and means on said roll spaced from said surface for transferring lumps of dough from the several rows to said chute in a predetermined order, the lumps of dough successively transferred by said roll being deposited in said chute at regular intervals independent of the spacing of the lumps in the individual rows on said traveling surface.

5. In a dough handling apparatus, the combination of a conveyor belt adapted to receive two laterally spaced rows of lumps of dough, a chute at the delivery end of said belt, and means fixed transversely of said belt for transferring lumps from said two rows alternately but at regular intervals in said chute said means engaging the lumps of dough only after they have reached the delivery end of said belt.

6. In a dough handling apparatus, the combination of a conveyor belt adapted to receive two laterally spaced rows of lumps of dough, a chute at the delivery end of said belt, and means for transferring lumps from said two rows alternately but at regular intervals in said chute, said means comprising a roll interposed between the chute and the delivery end of the belt, said roll having circumferentially spaced projections on its periphery at the ends thereof.

7. In a dough handling apparatus, the combination of a traveling, dough conveying surface, a chute at one end of said surface, and a transfer roll interposed between the chute and said surface end, said roll having means on its periphery at each end adapted to engage lumps of dough advanced to the roll by said conveying surface, the means at one end of said roll being staggered circumferentially of the roll with respect to those at the other end of said roll.

8. In a dough handling apparatus, the combination of a conveyor belt adapted to receive lateral spaced rows of lumps of dough, a transfer roll at one end of said belt, means at one end of the periphery of said roll adapted to engage successive lumps of dough in one of the rows carried by the belt, means at the other end of the periphery of said roll adapted to engage the lumps in the other row on said belt said two sets of means being spaced from each other circumferentially of the roll, and a chute in which said lumps of dough are deposited by said roll.

9. In a dough handling apparatus, the combination of a traveling surface adapted to support a plurality of rows of lumps of dough, a chute, a rotatable transfer roll beyond the delivery end of said surface, said roll being rotatable at a speed in excess of the speed of said traveling surface, and means on said roll for transferring lumps of dough from the several rows to said chute in a predetermined order.

10. A transfer roll for dough handling apparatus having a projection at each end of its periphery with the remaining portion of the periphery formed with a smooth surface, the projections at the two ends being spaced from each other circumferentially of the roll.

11. In a dough handling apparatus a traveling surface adapted to support laterally spaced rows of lumps of dough, a chute having a receiving end corresponding in width to said traveling surface, a revolving cylindrical surface extending the full width of the delivery end of said traveling surface and the receiving end of said chute, said revolving surface being interposed between the delivery end of the traveling surface and the receiving end of said chute, and means on said cylindrical surface for transferring said lumps of dough from the several rows on said traveling surface to said chute in predetermined order.

12. In a dough handling apparatus a traveling surface adapted to transport a plurality of laterally spaced rows of lumps of dough, a chute, and means for transferring the lumps of dough from the several rows on said surface to said chute in a predetermined order, the movement of the lumps of dough in each row by said surface and transfer means being in a straight line.

FRANK H. VAN HOUTEN.